United States Patent
Khawer et al.

(10) Patent No.: US 8,730,790 B2
(45) Date of Patent: May 20, 2014

(54) METHOD AND SYSTEM FOR CELL RECOVERY IN TELECOMMUNICATION NETWORKS

(75) Inventors: Mohammad R. Khawer, Lake Hopatcong, NJ (US); Mugur Abulius, Villejuif (FR)

(73) Assignee: Alcatel Lucent, Paris (FR)

( * ) Notice: Subject to any disclaimer, the term of this patent is extended or adjusted under 35 U.S.C. 154(b) by 128 days.

(21) Appl. No.: 12/950,096

(22) Filed: Nov. 19, 2010

(65) Prior Publication Data

US 2012/0131376 A1    May 24, 2012

(51) Int. Cl.
    *H04L 12/16*    (2006.01)

(52) U.S. Cl.
    USPC .......................... 370/216; 370/217; 370/221

(58) Field of Classification Search
    USPC ............ 370/216, 217, 218, 219, 220, 241, 370/241.1, 244; 714/100
    See application file for complete search history.

(56) References Cited

U.S. PATENT DOCUMENTS

| | | | |
|---|---|---|---|
| 5,408,464 A * | 4/1995 | Jurkevich | 370/219 |
| 5,913,230 A | 6/1999 | Richardson | |
| 6,115,748 A | 9/2000 | Hauser et al. | |
| 6,735,620 B1 | 5/2004 | Blackmore et al. | |
| 6,799,200 B1 | 9/2004 | Blackmore et al. | |
| 6,999,432 B2 | 2/2006 | Zhang et al. | |
| 7,003,042 B2 | 2/2006 | Morelos-Zaragoza et al. | |
| 7,089,289 B1 | 8/2006 | Blackmore et al. | |
| 7,093,013 B1 * | 8/2006 | Hornok et al. | 709/224 |
| 7,096,034 B2 | 8/2006 | Zhang et al. | |
| 7,180,866 B1 * | 2/2007 | Chartre et al. | 370/242 |
| 7,206,966 B2 | 4/2007 | Barr et al. | |
| 7,254,812 B1 | 8/2007 | Menezes | |
| 7,352,693 B2 * | 4/2008 | Seid et al. | 370/216 |
| 7,451,456 B2 | 11/2008 | Andjelic | |
| 7,571,440 B2 | 8/2009 | Vessey et al. | |
| 7,590,050 B2 * | 9/2009 | Foltak | 370/217 |
| 7,603,256 B2 * | 10/2009 | Cheng et al. | 702/185 |
| 7,609,652 B2 | 10/2009 | Kellerer et al. | |

(Continued)

FOREIGN PATENT DOCUMENTS

| | | |
|---|---|---|
| EP | 1 788 491 | 5/2007 |
| TW | 200813739 | 3/2008 |

(Continued)

OTHER PUBLICATIONS

Freescale Semiconductor; QorIQ™ P4080 Communcations Processor Product Brief; Sep. 2008; Freescale Semiconductor, Inc.; Rev. 1; pp. 2-5, 14-15, 19-22, 28-29.

(Continued)

*Primary Examiner* — Hassan Kizou
*Assistant Examiner* — Phyllis Book
(74) *Attorney, Agent, or Firm* — Fay Sharpe LLP (57) ABSTRACT

A method and system that helps to ensure that any cell crash (i.e., an involuntarily action occurring as a result of a software bug or malfunction) is localized to a single cell on a single modem board that supports multi-cell configuration. In this regard, the control plane and the remaining cells that are configured on the modem board should remain operational. Further the operator should be able to choose to take corrective action (i.e., reboot, reconfigure, delete, or create) with regard to a cell on the modem board without impacting the operations of the other configured cells.

15 Claims, 3 Drawing Sheets

(56) References Cited

U.S. PATENT DOCUMENTS

| | | | |
|---|---|---|---|
| 7,620,753 B1 | 11/2009 | Beaman et al. | |
| 7,656,815 B2 | 2/2010 | Kellerer et al. | |
| 7,668,191 B2 | 2/2010 | Steinback et al. | |
| 7,831,710 B2* | 11/2010 | Ing et al. | 709/224 |
| 7,873,964 B2 | 1/2011 | Huang et al. | |
| 7,933,197 B2* | 4/2011 | Bryant et al. | 370/216 |
| 7,953,915 B2 | 5/2011 | Ge et al. | |
| 8,024,417 B2 | 9/2011 | Mehrotra | |
| 8,059,532 B2 | 11/2011 | Riddle et al. | |
| 8,072,879 B2* | 12/2011 | Vasseur et al. | 370/225 |
| 8,099,546 B2 | 1/2012 | Rostedt | |
| 8,271,996 B1 | 9/2012 | Gould et al. | |
| 8,504,744 B2 | 8/2013 | Khawer et al. | |
| 2002/0087710 A1 | 7/2002 | Aiken et al. | |
| 2003/0188233 A1* | 10/2003 | Lubbers et al. | 714/100 |
| 2004/0062246 A1 | 4/2004 | Boucher et al. | |
| 2004/0081080 A1* | 4/2004 | Ji et al. | 370/216 |
| 2004/0187117 A1 | 9/2004 | Orion et al. | |
| 2005/0008011 A1 | 1/2005 | Georgiou et al. | |
| 2005/0111389 A1* | 5/2005 | Dick et al. | 370/278 |
| 2006/0003792 A1 | 1/2006 | Gholmieh et al. | |
| 2006/0041737 A1 | 2/2006 | Kumagai | |
| 2006/0046819 A1 | 3/2006 | Nguyen et al. | |
| 2007/0010281 A1 | 1/2007 | Sebire | |
| 2007/0104204 A1 | 5/2007 | Brokenshire et al. | |
| 2007/0195723 A1 | 8/2007 | Attar et al. | |
| 2007/0220294 A1 | 9/2007 | Lippett | |
| 2008/0002681 A1 | 1/2008 | Bajic et al. | |
| 2008/0002702 A1 | 1/2008 | Bajic et al. | |
| 2008/0107014 A1* | 5/2008 | Huang et al. | 370/216 |
| 2008/0276056 A1 | 11/2008 | Giacomoni et al. | |
| 2009/0055826 A1 | 2/2009 | Bernstein et al. | |
| 2009/0080369 A1* | 3/2009 | Uminski et al. | 370/328 |
| 2009/0097397 A1* | 4/2009 | Moreira Sa de Souza | 370/216 |
| 2009/0122756 A1 | 5/2009 | Gu et al. | |
| 2009/0207726 A1* | 8/2009 | Thomson et al. | 370/216 |
| 2009/0228890 A1* | 9/2009 | Vaitovirta et al. | 718/104 |
| 2009/0248934 A1 | 10/2009 | Ge et al. | |
| 2010/0008218 A1* | 1/2010 | Dumov et al. | 370/216 |
| 2010/0029266 A1 | 2/2010 | van Gassel et al. | |
| 2010/0080116 A1* | 4/2010 | Agashe et al. | 370/216 |
| 2010/0121975 A1 | 5/2010 | Sinha et al. | |
| 2010/0157814 A1 | 6/2010 | Ha et al. | |
| 2010/0184432 A1 | 7/2010 | Yano et al. | |
| 2010/0278038 A1* | 11/2010 | Stahle et al. | 370/216 |
| 2010/0295859 A1 | 11/2010 | Stauffer et al. | |
| 2010/0296428 A1 | 11/2010 | Ho | |
| 2010/0315561 A1 | 12/2010 | Cooper et al. | |
| 2010/0318996 A1 | 12/2010 | Harris et al. | |
| 2010/0322067 A1* | 12/2010 | Tenny | 370/216 |
| 2010/0322250 A1* | 12/2010 | Shetty et al. | 370/395.32 |
| 2010/0331056 A1 | 12/2010 | Nasrabadi et al. | |
| 2011/0044165 A1* | 2/2011 | Ni et al. | 370/221 |
| 2011/0069650 A1 | 3/2011 | Harkirat et al. | |
| 2011/0093733 A1 | 4/2011 | Kruglick | |
| 2011/0122884 A1 | 5/2011 | Tsirkin | |
| 2011/0138387 A1 | 6/2011 | Ahn et al. | |
| 2011/0292824 A1* | 12/2011 | Uemura et al. | 370/252 |
| 2012/0028636 A1 | 2/2012 | Khawer et al. | |
| 2012/0069728 A1* | 3/2012 | Jung et al. | 370/216 |
| 2012/0079290 A1 | 3/2012 | Kumar et al. | |
| 2012/0093047 A1 | 4/2012 | Khawer et al. | |
| 2012/0110223 A1 | 5/2012 | Khawer et al. | |
| 2012/0120965 A1 | 5/2012 | Khawer et al. | |
| 2012/0134320 A1 | 5/2012 | Khawer et al. | |
| 2012/0155398 A1 | 6/2012 | Oyman et al. | |
| 2012/0207011 A1* | 8/2012 | Franklin et al. | 370/216 |
| 2013/0017854 A1 | 1/2013 | Khawer | |
| 2013/0061231 A1 | 3/2013 | Zhang et al. | |
| 2013/0117305 A1 | 5/2013 | Varakin et al. | |

FOREIGN PATENT DOCUMENTS

| | | |
|---|---|---|
| WO | WO 01/63416 | 8/2001 |
| WO | WO 02/07464 | 1/2002 |
| WO | WO/2005098623 | 10/2005 |
| WO | WO 2008/005793 | 1/2008 |

OTHER PUBLICATIONS

RapidIO Trade Association; RapidIO™ Interconnect Specification; Jun. 2002; RapidIO™ Trade Association; Rev. 1.2; p. II-10.

Siu, Sam, "An Introduction to the QorIQ™ Data Path Acceleration Architecture (DPAA)"; Jun. 23, 2010; Freescale Semiconductor, Inc; FTF-NET-F0444; pp. 1-21.

Wang, Shrek ; An Introduction to the QorIQ™ Data Path Acceleration Architecture (DPAA); Aug. 2009; Freescale Technology Forum; 1-12.

Palaniappan, Sathish K., et al., "Efficient data transfer through zero copy", IBM Corporation, Sep. 2008.

International Search Report dated Oct. 24, 2012.

Freescale Semiconductor; QorIQ™ P4080 Communications Processor Product Brief; Sep. 2008; Freescale Semiconductor, P4080PB; Rev. 1, p. 1-33.

"Emerson Network Power: AMC-9210 AdvancedMC Module Preliminary Data Sheet", http://www.powerbridge.de, Jun. 1, 2008, pp. 1-3.

International Search Report dated Feb. 28, 2012.

Taiwan Search Report (with English Translation) dated Jan. 16, 2014 (from related U.S. Appl. No. 12/847,414).

\* cited by examiner

METHOD AND SYSTEM FOR CELL RECOVERY IN TELECOMMUNICATION NETWORKS

BACKGROUND OF THE INVENTION

The exemplary embodiments of the invention relate to a cell recovery procedure on a single modem board that supports a multi-cell configuration using a multi-core processor with a single SMP partition that contains all the processor cores. While the invention is particularly directed to the art of wireless telecommunications, and will be thus described with specific reference thereto, it will be appreciated that the invention may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE improves wireless network efficiency and bandwidth, lower costs and enhance services experience. Specifically, LTE makes use of new spectrum opportunities and offer better integration with other open standards. LTE generally includes an LTE RAN (Radio Access Network) (also known as E-UTRAN) along with an EPS (Evolved Packet System, also called Evolved Packet Core).

Communication systems are generally split into two primary functions: data plane functions and control plane functions. In previous LTE products, at least two processors were used on the modem board: one to support the control plane functions (non-real time, e.g., Operations, Administration, and Management (or OA&M), and call processing management-related functionalities), and another to terminate and support the data plane functions (real time, e.g., LTE Layer 2 processing). Both the control and data planes used different operating system (OS) instances, such as Linux for the control plane and a real-time OS such as vXWorks (made and sold by Wind River Systems of Alameda, Calif.) for the data plane core. Typically, one modem board supported one sector or cell. So to support multi-cell (e.g., three cells or six cells) configurations, it would be necessary to provide as many modem boards as the number of cells.

As an improvement, a multi-core processor may be used on a modem board in an LTE wireless base station. In that case, an operating system such as SMP Linux with PREEMPT RT patch runs on one SMP (symmetric multiprocessing) partition that contains all eight cores. In this configuration the control plane (non-real time threads/processes) and the data plane (real time threads/processes) share the same operating system instances even though they are bound to run on different cores.

Since the modem board supports multiple cells and sectors, cell recovery can become complex. In the previous implementation (i.e., using one modem board to support each cell), the cell recovery procedure following a software crash was simple. In that case, the entire modem board was rebooted. The modem board was then restarted with all of the hardware and software components initialized properly, ready for the master OA&M-C running on the controller board to reconfigure the cell on the modem board.

With the new architecture rebooting the modem board to recover or rescue a cell is no longer a viable option, as it will cause the control plane and the remaining active cells supported by the modem board to reboot as well. High availability is a critical service provider requirement and bringing down all of the cells when just one cell has to be restarted or reconfigured again after a software crash is not an acceptable option.

Thus, there is a need for a method and system that helps to ensure that any cell crash (i.e., an involuntarily action occurring as a result of a software bug or malfunction) is localized to a single cell. In this regard, the control plane and the remaining cells that are configured on the modem board should remain operational. Further, the operator should be able to choose to take corrective action (i.e., reboot, reconfigure, delete, or create) with regard to a cell on the modem board without impacting the operations of the other configured cells.

SUMMARY OF THE INVENTION

Described herein is an effective cell recovery procedure for rebooting (or recovering) a specific cell individually, either through operator intervention or automatically after a software malfunction (or crash) without impacting other active cells on the modem board.

In one embodiment, a computer-implemented method of providing a cell recovery mechanism on a single modem board that supports a multi-cell configuration with a multi-core processor is provided. One or more faults resulting from a failing cell are detected and one or more software components are notified that a cell is failing. In addition, resources related to the failing cell are released and postmortem data is collected. Further, an execution environment for hosting a new cell is set up and an Operations, Administration, and Management (OA&M) entity on a remote controller board is informed that a new cell can be started on the modem board.

In another embodiment, a system for providing cell recovery on a single modem board that supports a multi-cell configuration using a multi-core processor is provided. The system includes a modem board and a multi-core processor comprising a plurality of processor cores attached to the modem board, wherein the modem board comprises kernel space and user space. The system further includes a cell recovery mechanism that is configured to perform various functions. These functions may include, for example, detecting one or more faults resulting from a failing cell, notifying one or more software components that a cell is failing, releasing resources related to the failing cell, collecting postmortem data, setting up an execution environment for hosting a new cell, and informing an Operations, Administration, and Management (OA&M) entity on a remote controller board that a new cell can be started on the modem board.

In yet another embodiment, a non-transitory computer-usable data carrier storing instructions that, when executed by a computer, cause the computer to perform a cell recovery procedure. The cell recovery procedure may include various functions. For example, such functions may include detecting one or more faults resulting from a failing cell, notifying one or more software components that a cell is failing, releasing resources related to the failing cell, collecting postmortem data, setting up an execution environment for hosting a new cell, and informing an Operations, Administration, and Management (OA&M) entity on a remote controller board that a new cell can be started on the modem board.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
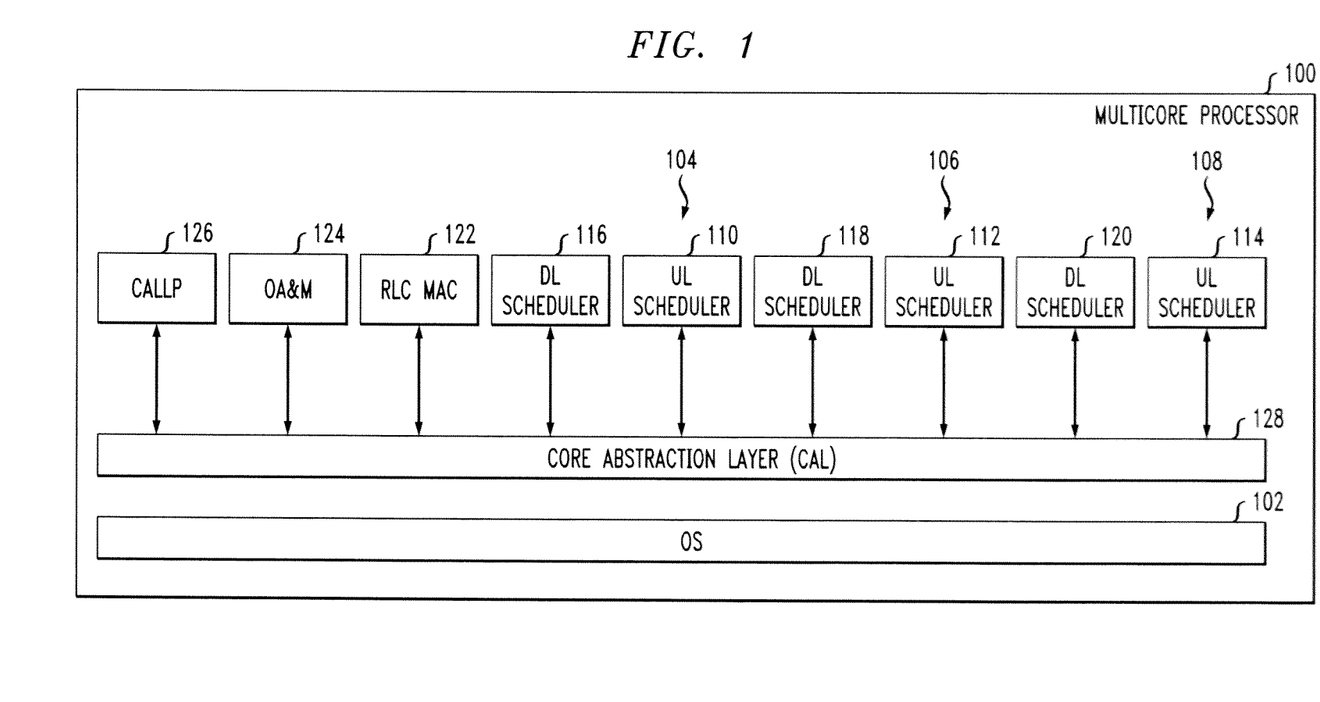
FIG. 1 illustrates one embodiment of a platform architecture in accordance with aspects of the present invention.

Referring now to the drawings wherein the showings are for purposes of illustrating the exemplary embodiments only and not for purposes of limiting the claimed subject matter, FIG. 1 provides a view of a system into which the presently described embodiments may be incorporated.

With reference now to FIG. 1, an exemplary platform architecture 100 is shown. This architecture is generally used on a modem board, but it is to be understood that it may be used in other applications. In this embodiment one partition is defined with all eight cores in it. It is to be appreciated, however, that the multi-core processor 100 may have any number of cores. With this embodiment, it is thus possible to use a single symmetric multiprocessing (SMP) operating system (OS) instance 102 that runs on all of the cores (e.g., eight cores). Since the control and data planes are under one OS instance, care is generally needed to ensure that a problem with the data plane will not bring down the control plane as well.

In this example, the multi-core processor 100 serves three cells (shown as 104, 106, and 108 in the figure). Each cell requires an uplink (UL) scheduler (shown as 110, 112, and 114 in the figure) and a downlink (DL) scheduler (shown as 116, 118, and 120 in FIG. 1).

It is known that the Radio Link Control (RLC) layer is used to segment, concatenate and correct errors on packet frames sent and received across the LTE air interface. The Radio Link Control and Medium Access Control (RLC/MAC) software is used in the GPRS (2.5G) wireless stack. It provides the acknowledged and the unacknowledged data transfer between the mobile station and the base station controller (BSC). Thus, the architecture 100 also includes an RLC/MAC block 122, which is the basic transport unit on the air interface that is used between the mobile station and the network. The RLC/MAC block 122 is generally used to carry data and RLC/MAC signaling.

The multi-core processor 100 also provides Operations, Administration, and Management (OA&M) module 124 and a call processing (or CALLP) module 126. OA&M is generally used to describe the processes, activities, tools, standards, and the like involved with operating, administering, managing and maintaining components in the telecommunications network. The CALLP module 126 typically manages the non-real-time aspects of the call processing activities.

In addition, the multi-core processor 100 includes a core abstraction layer (CAL) 128, which generally hides the core specific details from the Layer 2 (L2) application software. Layer 2 is the Data Link Layer of the seven-layer Open Systems Interconnection (OSI) model of computer networking. The Data Link Layer is the protocol layer that transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections. In this case, L2 generally refers to the L2 scheduler processing that is needed for the LTE air interface, which has very tight real time requirements.

To meet the real time performance needs of the base station, which is responsible for handling traffic and signaling between a mobile communication device and the network switching subsystem, an operating system such as SMP Linux with PREEMPT RT patch may be used. Of course, it is to be understood that other operating systems may be used. To achieve deterministic behavior in such an SMP configuration, the system is preferably implemented in a manner that employs core reservation and core affinity constructs to achieve a system behavior that is comparable to Asynchronous Multiprocessing (AMP). This is also desirable to get the best performance out of SMP Linux with PREEMPT RT, for example. Use of lockless zero copy services, such as buffer management and messaging services, may also help address any latency issues that may be posed by the use of the SMP Linux with PREEMPT RT operating system.

One of the main functions of the core abstraction layer (128) as shown in FIG. 1 is to provide high-level applications, such as L2 processing, with various services that utilize the full capabilities of the multi-core platform. The core abstraction layer is thus designed to achieve several goals. First, it supports a BED (Backplane Ethernet Driver) interface that is based on the new Data Path Acceleration Architecture (DPAA), while hiding the DPAA and multi-core specific implementations from higher-level application software (i.e., L2 software). (The DPAA is designed to optimize multi-core network processing such as load spreading and sharing of resources, including network interfaces and hardware accelerators.) Second, it utilizes the P4080's DPAA hardware components to provide an accelerated data path for user-plane data in both the ingress and egress directions. Third, it provides as much flexibility as possible so to easily adapt to configuration changes (i.e., without requiring code changes). An example of a CAL configuration is a DPAA resources configuration for buffer pools, ingress frame queues, and egress frame queues.

It is generally known that system memory in an operating system such as Linux can be divided into two distinct regions: kernel space and user space. Kernel space is where the kernel (i.e., the core of the operating system) executes (i.e., runs) and provides its services.

Memory generally consists of RAM (random access memory) cells, whose contents can be accessed (i.e., read and written to) at extremely high speeds but are retained only temporarily (i.e., while in use or, at most, while the power supply remains on). Its purpose is to hold programs and data that are currently in use.

User space is that set of memory locations in which user processes (i.e., everything other than the kernel) run. A process is an executing instance of a program. One of the roles of the kernel is to manage individual user processes within this space and to prevent them from interfering with each other.

Kernel space can be accessed by user processes only through the use of system calls. System calls are requests in a Unix-like operating system by an active process for a service performed by the kernel, such as input/output (I/O) or process creation. An active process is a process that is currently progressing in the CPU, as contrasted with a process that is waiting for its next turn in the CPU. I/O is any program, operation or device that transfers data to or from a CPU and to or from a peripheral device (such as disk drives, keyboards, mice and printers).

Thus, kernel space is strictly reserved for running the kernel, kernel extensions, and most device drivers. In contrast, user space is the memory area where all user mode applications work and this memory can be swapped out when necessary.

Figure 2:
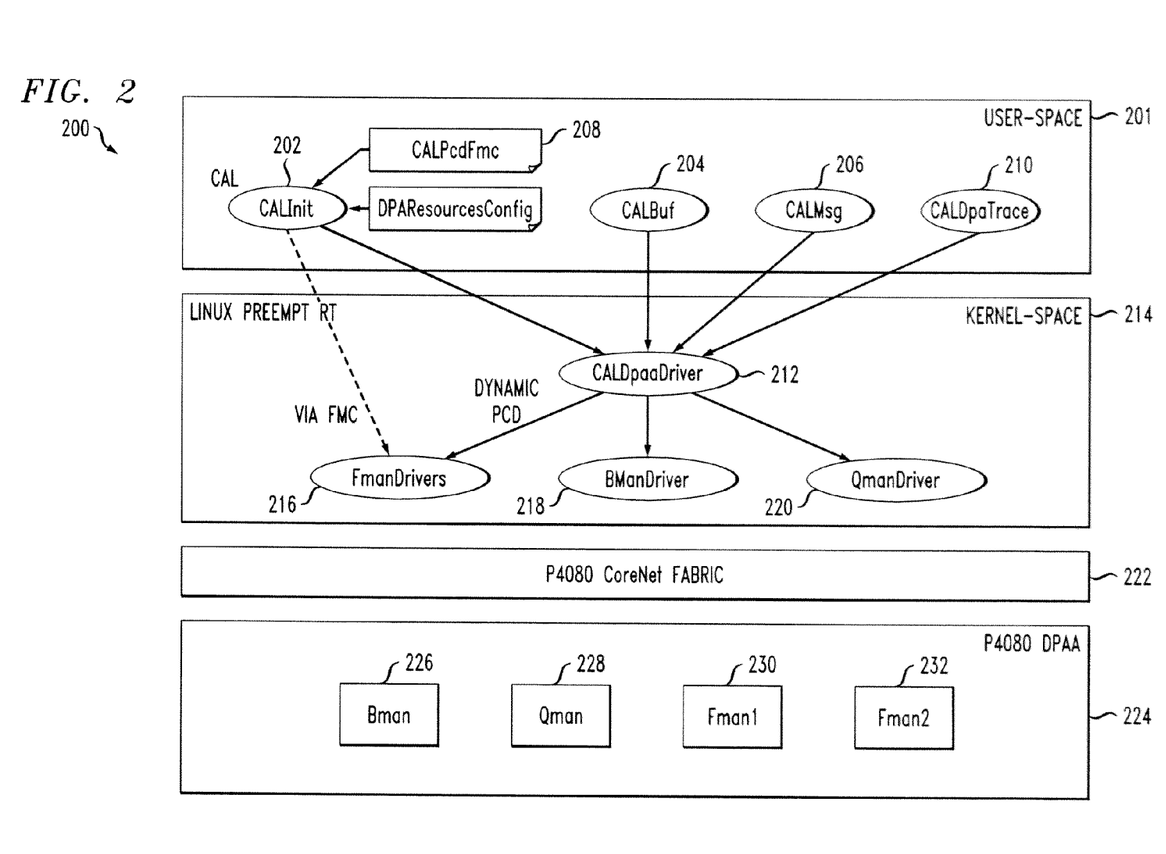
FIG. 2 illustrates an exemplary architecture for implementing the core abstraction layer shown in FIG. 1.

With reference now to FIG. 2, an exemplary architecture 200 that achieves these and other goals is shown. In this regard, the core abstraction layer (CAL) 201 includes various modules in user space, including, but not limited to: a core abstraction layer initialization (CALInit) module 202 that loads the LTE network configuration and any static Parsing, Classification and Distribution (PCD) rules to the frame managers (FMan) 230 and 232 and sets up the CAL framework based on a set of configuration files, a core abstraction layer buffer (CALBuf) module 204, a core abstraction layer messaging (CALMsg) module 206 that provides messaging services to L2 software to send and receive user-plane data to or from another board (i.e., eCCM), a core abstraction layer parsing, classifying and distributing (CALPcdFmc) module 208 that provides PCD rules and configurations to be used by each FMan (230, 232) for routing ingress frames to appropriate cores, and a core abstraction layer DPAA trace (CALDpaaTrace) module 210 that provides tracing capabilities for enabling and disabling traces in the core abstraction layer's DPAA driver (CALDpaaDriver) 212, which is a kernel space module.

The architecture 200 further includes a suitable operating system 214, such as SMP Linux with PREEMPT RT patch. The operating system 214, in turn, supports various drivers, such as the aforementioned CALDPaa driver 212, at least one frame manager (FMan) driver 216, at least one buffer manager (BMan) driver 218, and at least one queue manager (QMan) driver 220.

As shown in FIG. 2, the architecture 200 may suitably include a P4080 CoreNet fabric 222, which is an interconnect architecture suitable for scalable on-chip network to connect multiple power architecture processing cores with caches, stand-alone caches and memory subsystems.

The P4080 processor includes an implementation of the DPAA. Thus, the architecture 200 may further include a P4080 DPAA 224. The DPAA 224 is designed to optimize multi-core network processing such as load spreading and sharing of resources, including network interfaces and hardware accelerators. As shown, the DPAA 224 generally includes various managers such as a BMan 226, a QMan 228, and a first and second Fman 230 and 232, respectively.

It is known that in a wireless multiple-access communication system, transmitters and receivers may communicate using a multiple layer communication stack. The layers may include, for example, a physical layer, a medium access control (MAC) layer, a radio link control (RLC) layer, a protocol layer (e.g., packet data convergence protocol (PDCP) layer), an application layer and so on. The RLC layer receives service data units (SDU) from the PDCP layer, and concatenates or segments the SDUs into RLC protocol data units (PDU) for transmission to the MAC layer.

Accordingly, the CALBuf module 204 facilitates lock-less buffer management services for L2 applications for use in the RLC SDU processing. As known in the art, a non-blocking algorithm ensures that threads competing for a shared resource do not have their execution indefinitely postponed by mutual exclusion. A non-blocking algorithm is lock-less (or lock-free) if there is guaranteed system-wide progress. The CALBuf module 204 may also support querying for buffer pool statistical data (e.g., pool depletion state, depletion count, pool availability state, pool allocation error count, etc). The CALBuf module 204 generally interfaces with the CALDpaaDriver 212 to implement such services. The CALBuf module 204 further provides a lock-less buffer management scheme that is extremely critical for proper system operation in a multi-core environment, where a lock taken by a non-real time process may cause latency issues for a real time process waiting for the release of that lock.

The CALDpaaDriver 212 is the kernel space component of the CAL 201 and helps implement and provide buffer management services and messaging services using Bman and Qman APIs. As used herein, the term API (or application programming interface) refers to an interface implemented by a software program, which enables it to interact with other software. It facilitates interaction between different software programs similar to the way the user interface facilitates interaction between users and computers. An API is implemented by applications, libraries, and operating systems to determine their vocabularies and calling conventions, and is used to access their services. It may include specifications for routines, data structures, object classes, and protocols used to communicate between the consumer and the implementer of the API.

The CALDpaaDriver 212 is generally responsible for managing DPAA resources (buffer pools and frame queues) to be used for user-plane data distributing; providing user space interface to other CAL modules via various file operations such as open, close, i-o-control (ioctl) for initialization, buffer management, and messaging services; performing kernel-to-user-space (K-U) buffer mapping; providing DPAA buffer pool and receiver and transmitter statistical data; and implementing services for managing ring buffers. It should be noted that ring buffers generally represent the CAL's L2 software queue, and they are used to store frame descriptors (FDs) destined for a specific L2 downlink scheduler thread. The CALMsg module 206 provides APIs for L2 to retrieve buffer descriptors from a ring.

All of the CAL components described above are generally platform middleware (running in user space), with the exception of the CALDpaaDriver 212. The CALDpaaDriver 212 is a custom driver that runs in kernel space, and it is designed to implement and provide services needed by the CAL user space middleware—in particular, those services that depend on the P4080 DPAA hardware components.

The CALBuf module 204 provides buffer management services to be used exclusively for "fast path" data processing. The CALBuf module 204 provides user space APIs to L2 application. The CALBuf module 204 collaborates with the CALDpaaDriver 212 to provide zero copy and lock-less buffer management service for buffers that the CALDpaa driver 212 creates but are managed by the Bman 226.

As stated above, a lock-less buffer management scheme is important to meet the performance needs of a multi-core processor-based modem board, which uses one partition consisting of all eight cores and runs SMP Linux with PREEMPT RT. Without such a scheme the system may be subject to unbounded latency spikes, which may break down the entire system.

We turn now to the situation where one of the cells on the modem board is failing or has failed. With regard to the exemplary embodiments, there is no distinction between a failing cell and a failed cell. In either case, the end result is to release the resources acquired by such cells. In this regard, a cell recovery procedure may be implemented. One of the general requirements for the cell recovery procedure is that the recovery of a cell should not impact the functionalities, behavior and performances of the other cells that are on the same modem board that is hosting the failing cell. Furthermore, cell recovery should not introduce instability or resource shortages that may critically affect the other active cells on the modem board.

Figure 3:
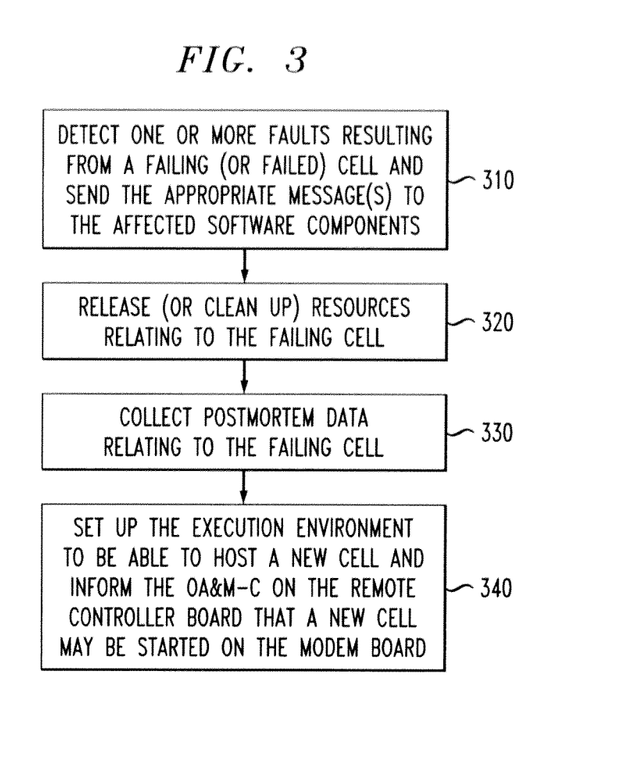
FIG. 3 illustrates an exemplary cell recovery procedure in accordance with aspects of the present invention.

Turning now to FIG. 3, an exemplary cell recovery procedure is illustrated in a flow chart. The basic functions of the cell recovery procedure are set forth below:

Detect one or more faults resulting from a failing (or failed) cell and send the appropriate message(s) to the affected software components (310);

Release (or clean up) resources relating to the failing cell (320);

Collect postmortem data relating to the failing cell (330); and

Set up the execution environment to be able to host a new cell and inform the OA&M-C on the remote controller board that a new cell may be started on the modem board (340).

It is to be understood that the exemplary cell recovery procedure is generally not an independent software component. Instead, the cell recovery procedure is suitably composed of a set of integrated procedures that are incorporated into many other software components relating to the modem board. The cell recovery procedure imposes various rules upon all software components that manage cell resources. In particular, the modem software components should adhere to various common design and coding rules.

First, the cell recovery procedure should be able to anticipate and detect failures of any other software and/or hardware components that are under their responsibility. Errors may be anticipated by periodically retrieving status and statistics. Also, the cell recovery procedure should detect failures for a predefined period of time (software and hardware watchdogs may be used). The health of any running entity should be monitored. Furthermore, any software component that allocates or activates system resources for a cell must provide cleanup procedures for these resources.

Suitably, the architecture 200 also includes a "launcher" process, which is a middleware component that launches all software processes, including the Layer 2 scheduler processes. It should be noted that Evolved Node B (eNodeB) supports the LTE air interface and performs radio resource management activities related to the failing/failed cell. In this regard, the LTE eNodeB application is a set of cooperating processes. These processes need to be started and monitored by a separate, reliable process. That supervisory process is called the launcher. The launcher is standalone and data driven, receiving the data needed to start, monitor, and recover the application processes via a set of configuration files. The launcher is started by the Linux init process (via a start script) and it, in turn, starts all other processes that make up the application. By design, the launcher generally uses only Linux services. The launcher process is the parent of all application processes. The launcher is generally "listening" for information regarding the process termination events (including Layer 2 process termination) on a regular basis.

When the code of a Layer 2 process associated with a cell fails (i.e., an involuntary termination of a Layer 2 process that is out of the control of the code) there are still some activities occurring in the context of the process prior to its termination. Linux, for example, typically "launches," in the context of the failing thread, the signal handlers and exit handlers that were set-up by LEC (Linux Error Collector) and other libraries. It is noted that some exit handlers are registered with the LEC and are subsequently invoked when a process terminates to gather information. Linux uses the signal handler to send signal notifications. Linux transparently invokes the "close" function of each driver that was opened by the failing process. In particular, it calls the fast path driver CALDpaaDriver 212. This is an opportunity to clean up cell related resources in kernel mode. If configured, at Layer 2 process termination, Linux generates a core dump.

Figure 4:
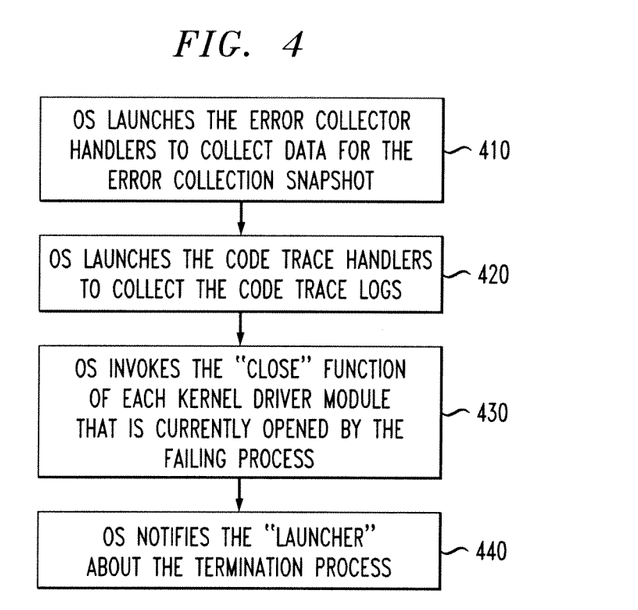
FIG. 4 illustrates an exemplary procedure for terminating processes.

FIG. 4 illustrates the chronology of process termination phases. Initially, the operating system 102 launches (transparently for the application code) the error collector handlers to collect data for the error collection snapshot (410). The operating system 214 then launches (transparently for the application code) the code trace handlers to collect the code trace logs (420). Next, the operating system 214 invokes the "close" function of each kernel driver module that is currently opened by the failing process (430) to perform any resource cleanup allocated to the failing process by the kernel driver module. Finally, the operating system 214 notifies the "launcher" about the termination process (440). Optionally, the launcher may also receive a termination event, including the termination status. The launcher then triggers the system-wide notification and resource cleanup procedure for the failed cell.

The multi-core processor also supports a "process monitor," which is also a middleware component. The process monitor uses a "publish/subscribe" service to publish the status, as well as the availability, of programs that are monitored. The process monitor may be connected to the launcher via a Linux message queue, for example. The process monitor is a child of the launcher process. As used herein, the term "child process" refers to a process created by another process (the parent process). Each process may create many child processes but will have only one parent process, except for the very first process, which has no parent. The first process, called init in Linux, is started by the kernel at boot time and never terminates.

When the launcher receives a process termination event (e.g., the SIGCHLD Linux signal) it sends the event, via a message queue, to the process monitor. As used herein, SIGCHLD refers to the signal sent to a process when a child process terminates. Using the publish/subscribe procedure, the process monitor publishes the termination state of the Layer 2 process as a "status change indication" for the process.

At its initialization, the local OA&M module 124 on the modem board subscribes to Layer 2 process "status change indications" as published by the process monitor. To subscribe, the OA&M module 124 should know the identity of all Layer 2 processes, which are typically in a predefined format. When the process monitor publishes the Layer 2 process "status change indication," the termination information is received by the OA&M module 124. When the OA&M module 124 receives the indication about a Layer 2 process termination it retrieves from the shared memory (preferably implemented with a kernel module) the information about the reason for the failure (e.g., a DSP software crash). The OA&M module 124 sends a message to the OA&M-C (running on the remote controller board) to stop, as soon as possible, all other eNodeB activities related to the failed cell.

If after the failure of a software component the ownership of such cell resources is still assigned to the failing component, the corresponding cleanup procedures must be activated in order to relinquish the ownership and to free the corresponding cell related resources. This requirement addresses mainly P4080 drivers that allocate cell resources in kernel space on behalf of a requesting application process. During cell configuration the L2 process in the user space registers itself with the CALMsg module 206. The CALMsg module 206, in turn, allocates resources (kernel, hardware) via the CALDpaaDriver 212 for the requesting L2 process.

Any fatal and unrecoverable software or hardware failure on a modem board has an impact on service availability. As stated earlier, the modem board generally includes many resources that are shared by multiple cells. Thus, the goals of the exemplary cell recovery procedure generally include shutting down associated software and revoking cell resources without impact on the running cells, being able to start up again the failing cell and optimize the service availability, and collecting enough data about the failure for post-mortem diagnostic purposes.

Since software failures on the scope of cell recovery procedure correspond to the loss of an entire software component associated with a cell, the corresponding telecom contexts cannot be recovered by the cell recovery procedure. The cell recovery procedure cannot necessarily avoid a service interruption for the falling cell, but it has as its main goal minimizing the duration and the scope of this interruption.

It is important to note that any crash involving a control plane process or thread will typically impact all cells configured on the modem board. Accordingly, for the normal termination process, whereby an operator issues a cell reboot command, the L2 process or thread should implement logic to perform a "clean up" (or release) all of its cell resources before terminating itself.

P4080 system resources allocated for a cell are managed in several ways. For example, some resources are allocated from system-wide shared pools. When such resources are allocated (i.e., owned by a cell) they cannot be reused by other components until they are explicitly released. In the case of a failure of the software owning resources from shared pools, the platform software must clean up these resources on behalf of the owner software. Otherwise, the corresponding resources will be lost forever. To clean up these resources, the platform requires a way to identify which cell owns them. For that reason each individual resource from a shared pool has an associated tag specifying the owner of the resource. The owner software should be updated each time a cell resource is allocated and each time it is released from the shared pool.

"Fast path" is a term used to describe a path with shorter instruction path length through a program as compared to the "normal path." For a fast path to be effective it must handle the most commonly occurring tasks more efficiently than the normal path, leaving the latter to handle uncommon cases, corner cases, error handling, and other anomalies. Fast paths are a form of optimization. Ingress buffer pools used by a fast path driver are an example of system-wide shared resources. They are dedicated to receive user-plane packets.

It should be noted that some other resources are allocated from private pools. Resources from private pools do not have to be tagged with the owner that holds the resource. This is because, when such resource is allocated, the owner is implicitly known. The platform software needs only to know the state of the cell; that is, whether the cell is busy or free of the resource. It should be noted that the cell resources are created when the execution environment is set up, but the resources are not necessarily allocated. Allocation is done when a logical cell is configured. Egress buffer pools used by the fast path driver are an example of cell specific private resources. They are dedicated to send user-plane packets. Resources allocated from shared pools and owned by a failing cell should be released by the cell recovery procedure as soon as possible.

When a Layer 2 process unexpectedly terminates, the cleanup of its resources can be accomplished during one of the following two phases, that is, (1) as soon as the operating system detects the termination of the process, or (2) later when the new instance of the Layer 2 scheduler process is spawned as part of cell initialization and/or configuration. If there are no specific issues, the cleanup of cell resources for a Layer 2 scheduler process should preferably occur after the corresponding Layer 2 scheduler process terminates.

Cell resources may be cleaned up for at least the following reasons: (1) to make room for remaining cells to run with enough system resources; and (2) to avoid depletion of resources and memory leaks if a new instance of the cell is created.

Cell software resources are allocated at several stages of the "life" of a cell. Some software resources are allocated when the cell is configured. Some other resources are frequently allocated and released depending on the activity of the cell. One such example is communication buffers. In that case, with regard to incoming data packets, a kernel-to-user-space (K-U) mapped buffer is acquired by the appropriate frame manager and has to be released by the downlink scheduler of the failing cell. When the software handling a cell fails, some of the communication buffers are still owned by the failing software component(s).

Generally, all cell specific resources (e.g., buffers, contexts, data structures, interrupts, threads, pending DMAs, etc.) may be affected by a cell failure. However, the way resources are managed is specific to the application architecture and to the behavior of the applicable operating system, such as Linux. For example, there may be a distinction between user space resources and kernel space resources as well as between private pools of resources and shared pools of resources. Likewise, there may be a distinction between the allocation from a central entity such as the CALLP module 126 or the OA&M module 124 as compared to allocation from a cell specific entity such as a Layer 2 scheduler process.

The memory management subsystem of an operating system such as Linux manages several virtual memory addressing spaces: one address space for each process and one address space for the kernel. When a process terminates, the operating system automatically releases all resources allocated from the process address space. Consequently, there is no need for an explicit cleanup of resources that are part of the process address space. The cell specific resources that are allocated on behalf of a failing cell from the kernel address space should be cleaned up by the platform software driver, e.g., the CALDpaaDriver 212. It should be noted that the termination of a process does not automatically clean up the cell resources from kernel modules.

The term "clean up" as used herein refers not only to memory buffers in kernel space but to many other kernel resources and activities specific to a cell as well. Some examples of such kernel resources and activities are described below.

By way of example, some interrupts may need to be disabled if the managed cell is deleted as a result of the cell crash. Likewise, some DMA transfers may need to be disabled if the managed cell is deleted (e.g., as a result of the cell crash).

DMA stands for direct memory access and refers to the ability of devices or other entities in a computing system to modify main memory contents without going through the CPU.

Drivers may use kernel threads for housekeeping, statistics or other periodic activities. These activities may be disabled if the managed cell is deleted e.g., as a result of a cell crash.

The ingress data flows in the data plane are first dispatched to the corresponding P4080 core and then to the right ingress ring of buffer descriptors matching a downlink scheduler thread, according to the configuration defined by fast path, DPAA and Linux requirements. In particular, the fast path and DPAA configuration for data flow should meet at least the following requirements:

1. The cell's logical IP address is to be defined on the modem board;
2. The frame queue associated with the cell's logical IP address should be bound to the QMan portal associated with the core that hosts the cell; and
3. The context of the frame queue associated with the cell should point to the ingress ring of buffer descriptors that is associated with the target cell.

With regard to cell recovery, the prior configuration for ingress data flow for the cell should be canceled. To cancel this configuration, several actions should be considered. For example, when the CALLP module 126 is called and informed about the cell failure it should remove the cell's logical IP address from the modem board. Further, when the "fast path" CALMsg module 206 is notified about a Layer 2 scheduler process termination, it may change the mapping between the ingress frame queues from the current data plane core back to the control plane core.

It should be noted that the CALMsg module 206 of FIG. 2 includes various APIs, including registration and deregistration functions. In this regard, several procedures are generally provided for cell resources allocated on behalf of a Layer 2 process, including, but not limited to: (1) a CALMsg registration function (one for each data flow type: ingress and egress); (2) a CALMsg deregistration function (one for each data flow type: ingress and egress); and (3) a driver "close" procedure (it covers all data flow types).

The CALMsg registration function for the BED interface requests the fast path kernel module to create required resources for both the egress and the ingress data flow types. The CALMsg registration function also requests the fast path kernel module to clean up the remaining resources from the previous instance of the same Layer 2 scheduler process. The Layer 2 scheduler process calls the CALMsg registration function of the BED interface when it receives the cell set-up request from the CALLP module 126.

The egress buffers allocated by Layer 2 scheduler processes from the private egress buffer pools are possible candidates for cleanup by the next instance of a Layer 2 process. These resources correspond to the egress data flow types. One reason to postpone the cleanup of these resources comes from the need to give time to the appropriate frame manager to send and free all the data packets that were already enqueued by the L2 uplink scheduler before its crash. Egress buffers of the buffer manager are part of private buffer pools, and resetting buffer pools is a relatively simple operation. Therefore, resetting the buffer pools can be done when the Layer 2 scheduler process receives the cell set-up message and not necessarily at the moment the Layer 2 scheduler process is created.

In addition to the entry points corresponding to the CAL APIs as specified by the BED interface chapters, the fast path driver, e.g., the CALDpaaDriver 212, must provide a "close" entry point. Any driver that is invoked by an application should provide the "open" and "close" entry points. Unlike the other entry points exposed by the CAL library, the "close" entry point for the fast path module is not exposed to a Layer 2 scheduler application. The Layer 2 scheduler application cannot directly call the "close" function for fast path driver.

The "close" function for a driver is generally a standard Linux function for any driver. If a process terminates, Linux finds all drivers that were opened by the terminating process and invokes the "close" entry points, one after the other, for all of these drivers. The "close" function can determine the PID (Process ID) of the calling Layer 2 scheduler process and the core number from which it was invoked. The "close" function can associate the requestor PID with the corresponding cell ID. The "close" function may clean up cell resources owned by the corresponding cell ID, such as the ring of buffer descriptors.

The OA&M module 124 can determine, from among several core dump files in the FFS (Flash File System), which file corresponds to the termination status received from the process monitor. In this way, it can manage the storage space for core dumps for postmortem analysis. The postmortem data generally includes the core dump and code trace logs, which are used for the root cause analysis of the cell crash. The OA&M module 124 attempts to ensure that all required resource cleanup is accomplished (e.g., invoke the CALBuf API to release orphan ingress data buffers in use by the failing cell). The execution environment is set up to be able to host a new cell, i.e., it is necessary to set up all the software and hardware resources that a new cell may need prior to cell configuration by the OA&M-C. The local OA&M module 124 on the modem board thus notifies the remote master OA&M-C that a new cell may again be configured on the board.

Restarting a modem board may take minutes and affects all cells hosted by the board. A successful cell recovery takes only a few seconds and typically affects only the failing cell. Collecting data for postmortem analysis is generally the longest step of cell recovery procedure. This step typically cannot be shortened, since a digital signal processor (DSP) cannot restart during its memory dump. The duration of the other cell recovery steps is not necessarily crucial, as they are measured in TTI (Transmission Time Interval) ticks (typically less than 1 second).

As for the software components dedicated to the cell, there are various possibilities for implementing the cell recovery procedure. One way is to bring up only the failing software component (associated with the failing cell) and to clean up associated resources and roll back the other components (associated with the failing cell) to an initial state without stopping them. Because of the wide range of failure possibilities and the strong interdependencies between software components, this solution is complex and not without some risk. A preferable approach may be to stop the components by "brute force" and then re-launch all participating software components associated with the failing cell, even if only one is (suspected to be) failed.

A person of skill in the art would readily recognize that steps of various above-described methods can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described methods.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A system for providing cell recovery for a multi-cell configuration on a modem board in a telecommunications network, the system comprising:
 a modem board; and
 a multi-core processor attached to the modem board, wherein the multi-core processor comprises a plurality of processor cores configured under a single symmetric multiprocessing partition and served by a single operating system instance that serves a shared control plane and N data planes, where N is the number of configured cells on the modem board, wherein the multi-core processor is further configured to perform at least the following functions:
 detect one or more faults resulting from a failing cell;
 identify the failing cell and the system resources allocated to the failing cell from a system-wide shared pool of resources;
 release the resources allocated to the failing cell;
 perform a recovery of the failing cell without impacting either the shared control plane or other operational cells;
 set up an execution environment for hosting a new cell by:
  configuring resources associated with the failing cell's logical IP address on the modem board;
  binding a frame queue associated with the new cell's logical IP address to a queue manager portal associated with the core that hosts the cell to set up a packet transmission path;
  pointing a context of the frame queue associated with the new cell to an ingress ring of buffer descriptors that is associated with a target cell for incoming data plane packets; and
 inform an Operations, Administration, and Management (OA&M) entity on a remote controller board that a new cell can be started on the modem board.

2. The system of claim 1, wherein cell recovery is achieved without rebooting or resetting the multi-core processor or restarting the single instance of the operating system shared by both the control and data planes.

3. The system of claim 2, wherein the multi-core processor, upon detecting a cell failure (Layer 2 process termination), is further configured to:
 notify a call processing module to retrieve a logical IP address of the cell removed from the modem board;
 change mapping between one or more ingress frame queues from the current data plane core back to the control plane core such that incoming packets destined for the particular core are still handled until a new cell is configured on the core;
 disable interrupts for the cell Layer 2 process;
 disable direct memory access transfers associated with the failed cell.

4. The system of claim 3, wherein the multi-core processor is further configured to release allocated resources from the shared system-wide resource pool for the failed cell back to the shared pool by:
 performing additional bookkeeping so that each individual resource from a system-wide shared pool of communication buffers has an associated tag specifying the owner of the resource;
 updating the owner tag each time a cell resource is allocated and each time it is released from the shared pool.

5. The system of claim 1, wherein the multi-core processor explicitly invokes a platform software driver to release cell specific resources that are allocated on behalf of the failing cell from the kernel address space as the operating system automatically releases only the resources that are allocated from the process address space.

6. The system of claim 1, wherein one or more software components are notified that a cell is failing, the software components comprising at least one of an OA&M entity on the modem board and a call processing module on the modem board.

7. The system of claim 1, wherein the multi-core processor is further configured to collect postmortem data for root cause analysis by:
 launching a plurality of error collector handlers to collect data for an error collection snapshot (core dump);
 launching a plurality of code trace handlers to collect a plurality of code trace logs.

8. The system of claim 1, wherein the multi-core processor is further configured to stop the software components associated with the failing cell and then re-launch the software components associated with the failing cell.

9. A computer-implemented method of providing cell recovery for a multi-cell configuration on a modem board in a telecommunications network, the method comprising:
 detecting one or more faults resulting from a failing cell via a multi-core processor attached to the modem board, wherein the multi-core processor comprises a plurality of processor cores configured under a single symmetric multiprocessing partition and served by a single operating system instance that serves a shared control plane and N data planes, where N is the number of configured cells on the modem board;
 identifying the failing cell and the system resources allocated to the failing cell from a system-wide shared pool of resources;
 releasing the resources allocated to the failing cell;
 performing a recovery of the failing cell without impacting either the shared control plane or other operational cells;
 setting up an execution environment for hosting a new cell by
  configuring resources associated with the failing cell's logical IP address on the modem board;
  binding a frame queue associated with the new cell's logical IP address to a queue manager portal associated with the core that hosts the cell to set up a packet transmission path; vc
  pointing a context of the frame queue associated with the new cell to an ingress ring of buffer descriptors that is associated with a target cell for incoming data plane packets; and
 informing an Operations, Administration, and Management (OA&M) entity on a remote controller board that a new cell can be started on the modem board.

10. The method of claim 9, wherein cell recovery is achieved without rebooting or resetting the multi-core processor or restarting the single instance of the operating system shared by both the control and data planes.

11. The method of claim 10, further comprising:
upon detecting a cell failure (Layer 2 process termination), notifying a call processing module to retrieve a logical IP address of the cell removed from the modem board;
changing mapping between one or more ingress frame queues from the current data plane core back to the control plane core such that incoming packets destined for the particular core are still handled until a new cell is configured on the core;
disabling interrupts for the cell Layer 2 process;
disabling direct memory access transfers associated with the failed cell.

12. The method of claim 11, further comprising releasing allocated resources from the shared system-wide resource pool for the failed cell back to the shared pool by:
performing additional bookkeeping so that each individual resource from a system-wide shared pool of communication buffers has an associated tag specifying the owner of the resource;
updating the owner tag each time a cell resource is allocated and each time it is released from the shared pool.

13. The method of claim 9, wherein the multi-core processor explicitly invokes a platform software driver to release cell specific resources that are allocated on behalf of the failing cell from the kernel address space as the operating system automatically releases only the resources that are allocated from the process address space.

14. The method of claim 9, further comprising notifying one or more software components that a cell is failing, wherein the one or more software components comprise at least one of an OA&M entity on the modem board and a call processing module on the modem board.

15. The method of claim 9, further comprising collecting postmortem data for root cause analysis by:
launching a plurality of error collector handlers to collect data for an error collection snapshot (core dump);
launching a plurality of code trace handlers to collect a plurality of code trace logs.

* * * * *